(12) United States Patent
Bösl et al.

(10) Patent No.: US 11,035,757 B2
(45) Date of Patent: Jun. 15, 2021

(54) TESTING SYSTEM FOR TESTING THE ROLLING RESISTANCE OF AT LEAST ONE VEHICLE TIRE AND METHOD FOR TESTING THE ROLLING RESISTANCE OF THE VEHICLE TIRE

(71) Applicant: ZF Friedrichshafen AG, Friedrichshafen (DE)

(72) Inventors: Roland Bösl, Neuburg am Inn (DE); Wolfgang Saxinger, Thyrnau (DE); Jens Eisenbeiss, Fuerstenzell (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 240 days.

(21) Appl. No.: 16/305,494

(22) PCT Filed: Apr. 27, 2017

(86) PCT No.: PCT/EP2017/060001
§ 371 (c)(1),
(2) Date: Nov. 29, 2018

(87) PCT Pub. No.: WO2017/207180
PCT Pub. Date: Dec. 7, 2017

(65) Prior Publication Data
US 2019/0204185 A1 Jul. 4, 2019

(30) Foreign Application Priority Data

May 30, 2016 (DE) ..................... 10 2016 209 325.8

(51) Int. Cl.
*G01M 17/02* (2006.01)
(52) U.S. Cl.
CPC ............................... *G01M 17/022* (2013.01)

(58) Field of Classification Search
CPC .... G01M 17/022; G01M 5/00; G01M 5/0075; G01M 17/02
(Continued)

(56) References Cited

U.S. PATENT DOCUMENTS 5,323,646 A * 6/1994 Poling, Sr. .......... G01M 17/022
73/146
9,096,384 B2 8/2015 Wakazono et al.
(Continued)

FOREIGN PATENT DOCUMENTS

DE          39 05 475 A1     8/1990
DE  10 2014 207 090 A1     11/2014
(Continued)

OTHER PUBLICATIONS

German Search Report Corresponding to 10 2016 209 325.8 dated Jan. 11, 2017.
(Continued)

*Primary Examiner* — Robert R Raevis
(74) *Attorney, Agent, or Firm* — Finch & Maloney, PLLC; Michael J. Bujold

(57) ABSTRACT

A test system for testing a rolling resistance of a vehicle tire, with a measurement device. The measurement device has a load device that includes a load roller which applies a test load on the tire. The measurement device has a receiving device which receives the tire. The receiving device and the load device can be moved relative to one another. The measurement device has a drive device which rotationally drives at least one of the load roller and the receiving device. The measurement device has at least one test configuration for measuring the rolling resistance. The receiving device has first and second rim elements that together form a split rim engagement unit for accommodating the tire.

19 Claims, 7 Drawing Sheets

(58) Field of Classification Search
USPC .............................. 73/9, 146, 865.9, 862.541
See application file for complete search history.

(56) References Cited

U.S. PATENT DOCUMENTS

| | | |
|---|---|---|
| 2004/0163455 A1 | 8/2004 | Deniau |
| 2005/0211362 A1* | 9/2005 | Hirayama ........... B60C 15/0607 |
| | | 152/547 |
| 2011/0138899 A1* | 6/2011 | Inoue .................. G01M 17/022 |
| | | 73/146 |
| 2014/0311231 A1* | 10/2014 | Braghiroli ........... G01M 17/021 |
| | | 73/146 |
| 2020/0041384 A1* | 2/2020 | Okada ................... G01M 17/02 |

FOREIGN PATENT DOCUMENTS

| | | |
|---|---|---|
| EP | 1 239 275 A2 | 9/2002 |
| EP | 2 793 013 A1 | 10/2014 |
| WO | 88/09923 A2 | 12/1988 |
| WO | 98/35844 A1 | 8/1998 |
| WO | 2006/019620 A1 | 2/2006 |
| WO | 2009/116513 A1 | 9/2009 |

OTHER PUBLICATIONS

International Search Report Corresponding to PCT/EP2017/060001 dated Jul. 12, 2017.
Written Opinion Corresponding to PCT/EP2017/060001 dated Jul. 12, 2017.

\* cited by examiner

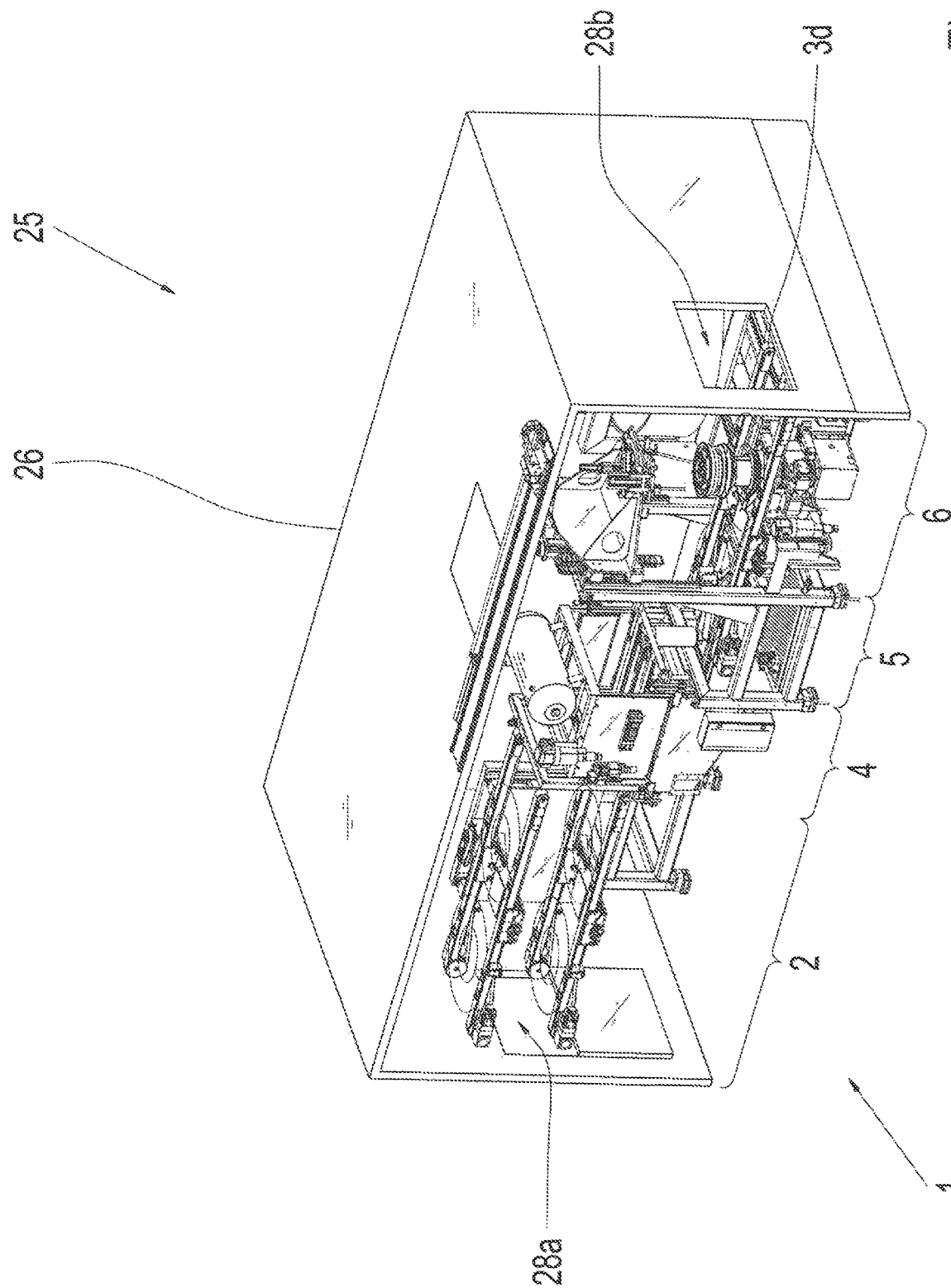

TESTING SYSTEM FOR TESTING THE ROLLING RESISTANCE OF AT LEAST ONE VEHICLE TIRE AND METHOD FOR TESTING THE ROLLING RESISTANCE OF THE VEHICLE TIRE

This application is a National Stage completion of PCT/EP2017/060001 filed Apr. 27, 2017, which claims priority from German patent application serial no. 10 2016 209 325.8 filed May 30, 2016.

FIELD OF THE INVENTION

The invention concerns a test system for testing the rolling resistance of at least one vehicle tire. Also, the invention concerns a method for testing the rolling resistance of at least one vehicle tire by using the test system.

BACKGROUND OF THE INVENTION

Often, laboratory machines are used for the quality control of the tire rolling resistance values. These machines are manually loaded, whereby a tire needs to be mounted on a rim and thereafter, for instance with wheel bolts, be connected with the laboratory machine. After finishing the test, the tire needs to be manually removed and thereafter be separated from the rim.

The publication EP 2 793 013 B1, which most likely represents the closest state of the technology, describes a service device for motor vehicles wheels, in particular a balancing machine or tire changing machine. The service device comprises a mounting means provided to rotatably receive a tire/rim configuration including a tire and a rim. In addition, the service device comprises a load means for applying a predetermined load at a perimeter of the tire/rim configuration, as well as first drive means provided to move the mounting means and the load means relative to each other, wherein secondary drive means are provided which make the tire/rim configuration rotate when these are engaged by the load means. A sensor configuration is provided to determine forces which act between the circumferential surface and the load means, wherein the forces include at least a first force which acts in the radial direction at the tire/rim configuration, and a second force which acts towards a perimeter direction of the tire/rim configuration. Also, an evaluation device is positioned, which determines a first rolling resistance coefficient of the tire on the basis of the first and the second force, which are detected by the sensor configuration.

SUMMARY OF THE INVENTION

The object of the present invention is to propose a test system for testing of the rolling resistance of at least one vehicle tire, which accelerates the entire testing process. The object is achieved with a test system with the characteristics of the independent claims, as well as with a method with the characteristics of the independent claims.

Preferred and advantageous embodiments of the invention result from the dependent claims, the following description, and/or the attached drawings.

In accordance with the invention, a test system is proposed for the testing of a rolling resistance of a vehicle tire. In particular, the function of the test system is to determine the rolling resistance of a vehicle tire on the basis of, in particular, at least one, preferably two detected measurement variables. In particular, the test system is a test stand or a test cell, whereby the test system represents, for instance a part or partial section, respectively, of an assembly or production line. For instance, the vehicle tire is an automobile tire or a motorbike tire, or a truck tire, whereby the vehicle tire is made from an elastic material, preferably from rubber.

The test system comprises a measurement device. The measurement device has the function of simulating in particular an operating condition of the vehicle tire. For instance, the measurement device is a partial section of the test system or forms the test system.

In addition, the measurement device has a load device. The load device has a load roller to create a test load on the vehicle tire. Hereby and in particular, the vehicle tire is acted upon by the load device with at least one force. Preferably, the force is equal to the force of weight of a vehicle or the vertical wheel force, respectively. Preferably, vehicle tire is acted upon with a load of at least 0.1 t, preferably more than 0.5 t, especially preferably with more than 2 t, and specially with more than 30 t. Alternatively or optionally and in addition, the vehicle tire is subjected to a load of less than 100 t, preferably less than 20 t, especially preferably less than 5 t, in particular less than 1.5 t. The load roller defines a first rotational axis. In particular, the load roller is mounted coaxially with the first rotational axis.

Also, the measurement device has a receiving device to accommodate the vehicle tire. In particular, the receiving device is rotatably mounted. Preferably, the vehicle tire with the receiving device is positively and/or non-positively and/or frictionally engaged, particularly preferably rotationally fixed and/or connectable.

The receiving device and the load device can be moved relative to each other. In particular, the receiving device can be moved in the direction of the load device and/or the load device in the direction of the receiving device, so that preferably the vehicle tire, in particular the perimeter surface of the tire, is in or can be brought into contact with the load roller, in particular a cylinder shell surface of the load roller. The receiving device defines a second rotational axis. In particular, the second rotational axis forms a line parallel to the first rotational axis. Preferably, the receiving device is mounted coaxially with the second rotational axis. In particular, the vehicle tire can be acted upon by means of the load device with a force which acts radially in the direction of the second rotational axis.

The test device has at least a drive device, whereby the drive device rotationally drives the load roller and/or the receiving device. In particular, the drive device is connected with the load roller and/or the receiving device by transmission technology. Preferably, the load roller and the receiving device are brought into rotational movement when the load roller makes contact with the vehicle tire. In particular, the drive device is an electrical motor, whereby the electric motor creates a torque. In particular the drive device sets the load roller in a rotational movement in the circumferential direction with respect to the first rotational axis and/or the vehicle tire, or the receiving device, respectively, in a rotational movement in the direction of rotation with respect to the second rotational axis.

The test device has at least a measuring arrangement for measuring the rolling resistance. In particular, the test device has the function to calculate the rolling resistance from at least one detected measurement value. In particular, the test device comprises an evaluation configuration which calculates the rolling resistance of a vehicle tire from at least one, preferably two, especially preferably from at least three detected measurement values.

It is proposed in the framework of the invention that the receiving device has at least a first and a second rim element, wherein the first and the second rim element create a split rim engagement device for receiving the vehicle tire. In particular, the function of the receiving device is to accommodate the vehicle tire between the first and the second rim element so that preferably the two rim elements fix the tire and that it, for instance, can roll on the load roller. In particular, the reception of the vehicle tire takes place automatically.

Through the test system, in accordance with the invention, a vehicle tire to be tested does not need to be mounted on a rim or be removed, respectively, from a rim, whereby a complete, manual mounting process is eliminated and thus, the testing process for the determination of the rolling resistance can be significantly accelerated. Also, a tire which was already installed on a rim is not new anymore and thus, cannot be sold as a new tire. Because of the split-rim engagement system, the tires are gently being received by the rim elements, whereby the vehicle tires are exposed significantly to lesser loads, so that resulting damages, which in particular affect the test values, are significantly reduced.

In a preferred embodiment of the invention, the first rim element is a first rim half and the second rim element a second rim half, wherein the two rim halves together form a test rim has a rim closing unit. In particular, the first and/or the second rim half have a bearing on a measurement spindle, whereby the measurement spindle extends axially in reference to the second rotational axis. Especially preferred, the first and/or the second measurement rim are positioned or can be positioned coaxially and/or concentrically in reference to the measurement rim or the second rotational axis, respectively. In particular, the two rim halves are mirror-symmetrically positioned and can be separated from each other. In particular, the second rim half is fixedly connected with the measurement spindle, and/or interlocking, and/or material locking, and/or friction locking connection, so that torque can be transferred on the measurement spindle to the second rim half or that eight or from the second rim half can be transferred to the measurement spindle. In particular, the two rim halves are separated by a sectional plane, whereby the sectional plane is a radial plane in reference to the second rotational axis.

In an additional, preferred embodiment at least one of the rim elements is axially movable with respect to the second rotational axis, wherein the first rim element is separated from the second rim element in an assembly position. In particular, the first rim element can be shifted by the second rim element, and/or the second rim element by the first rim element, as far in the axial direction, so that preferably the vehicle tire can be positioned between the two rim elements. In particular, the first rim element can be shifted in the axial direction relatively to the second rim element, whereby preferably the second rim element is fixedly-connected with the measurement spindle and is therefore especially fixed in the axial direction. In particular and in the mounting position, the vehicle tires are positioned between the two rim elements, coaxially in reference to the second rotational axis.

In a preferred, constructive implementation, the receiving device has a rim width adjustment device, wherein the rim width adjustment device alters the rim width of the receiving device. The rim width adjustment device, in particular, functions to reduce or enlarge an outer diameter of the two rim elements, so that, preferably, vehicle tires of different sizes can be received in the receiving device, especially preferably without an exchange of the rim elements. In particular, a rim width adjustment device can be driven hydraulically and/or pneumatically. For instance, the rim width adjustment device has a drive motor, preferably an electro-motor. In particular, the rim width adjustment device adjusts the first and/or the second rim element in the radial direction in reference to the second rotational axis. In particular, the adjustment range of the outer diameter is at least 13", preferably more than 17", especially preferred more than 21", in particular more than 25". Alternatively, or optionally as an addition, is the adjustment range for the outer diameter of the first and/or second rim elements, for a rim size of less than 40", preferably less than 23", especially preferred with less than 19", especially less than 15".

In a further preferred embodiment of the invention, the test measurement device has at least one force detection device, for detecting the wheel vertical force. In particular, the at least one force detection device has a force sensor, whereby the force sensor is especially and preferably designed the detect the vertical wheel force. In particular, the force sensor is piezo-electric and/or an electro-magnetic and/or resistive load receiver. In particular, the load sensor frictionlessly detects the vertical wheel force. In particular, the force detection device is or can be connected with the calculation processing device for signal transmission via a cable or a wireless connection. The load detection device is connected with the receiving device and/or the load device. In particular, the force detection device is connected with the measuring spindle and/or additional components of the receiving device, for instance with the first and/or the second rim element. Alternatively and optionally, the load detection device can also be connected with the load roller.

In an alternative or optionally further embodiment, the measurement device has at least an additional load detecting device to detect tangential forces. In particular, the at least one, additional load detecting device has a force sensor. In particular, the force sensor is a piezo-electric and/or electro-magnetic and/or a resistive force detector. In particular, the further load detecting device is, in particular, connected or can be connected, through cables or wirelessly with the evaluation device for signal transfer. In particular, the evaluation device calculates the rolling resistance of the vehicle tire from the detected vertical tire force and/or the tangential force values. The additional force detecting device is connected with the receiving device and/or the load device. As an alternative, the at least one and the additional force detecting devices form a common force detecting device, so that preferably the common force detecting device is designed to detect the vertical wheel force and the tangential force, wherein especially preferred, the common force detecting device is connected with the receiving device and/or load device.

In an alternative or optionally supplementary embodiment, the measuring device has at least one further force detection device for detecting tangential force. In particular, the force detection device has at least a torque sensor. Preferably, the torque sensor is a piezo-electric or magnetic or optical or a resistive sensor. In particular, the torque detecting device is connected or can be connected via cables or wirelessly with the evaluation device for signal transmission. The torque detecting device is connected with the receiving device and/or load device. In particular, the at least one drive device and/or load roller and/or the receiving device preferably the measurement spindle, has the torque detection device to detect the drive torque or torque, respectively, caused by the rolling resistance.

In a further development of the invention, the measuring device in each case has a drive device for driving the load roller and the receiving device. In particular, the first drive device is gear-wise connected with the load roller and a second drive device is gear-wise connected with the receiving device, preferably the measuring spindle. In particular, the rotational movement takes place in the rotational direction of the two drive devices, in particular the load roller and the vehicle tire, either in parallel or opposite to each other.

In a further preferred structural implementation, the measurement device has at least one adjusting device, wherein the adjusting device tilts the second rotational axis relative to the first rotational axis. Alternatively or in addition, the measuring device may comprise at least one further adjusting device, wherein the further adjusting device tilts the first rotational axis relative to the second rotational axis. The adjusting device functions in particular to simulate a fall of the vehicle tire, so that preferably the vehicle tire can be tested with different load points. In particular, the adjusting device is an additional drive motor and alternatively the adjusting device and the rim width adjustment device are driven by a common drive motor. In particular, the adjusting device readjusts the measurement spindle and/or the receiving device so that preferably the second rotational axis tilts relative to the first rotational axis. In particular, the second rotational axis can be positioned as skewed or as parallel to the first rotational axis, or bisects the second rotational axis. Alternatively or as an option, the load device, preferably the load roller, can be tilted so that the first rotational axis is tilted relative to the second rotational axis. Preferably, the adjusting device and/or the rim width actuator unit and/or the second drive device are a common drive unit.

In a further embodiment of the invention, the measuring device has an assembly device. In particular the assembly device has the function of receiving one of the two rim elements, preferably the first rim element, and so that it can be shifted in the axial direction. In addition, the assembly device locks, in particular, the two rim elements with each other, so that the measurement rim is preferably formed and the vehicle tire is particularly preferably received between the two rim elements. The assembly device has for instance an assembly slider wherein the assembly slider is guided in particular on a track. In particular, the assembly device is operated electrically and/or pneumatically and/or hydraulically. The at least one track is, particularly preferred, positioned parallel to the second rotational axis.

The assembly device has an actuating module, and whereby the actuating module is designed to lock the rim system. In particular, the actuating module is connected with the assembly slider. In particular, the actuating module accommodates, in a first step, the first rim element so that the first rim element is preferably connected with the actuating module. In a second assembly step, the assembly device lifts, in particular, the first rim element in the axial direction of the second rim element and/or from the vehicle tire so that, preferably, the tool rim elements are distanced from each other. In a third assembly step and in particular, an additional vehicle tire, which needs to be tested, is positioned coaxially in reference to the second rotational axis between the two rim elements. In a fourth assembly step, the assembly device moves, in particular, the first rim element, again in an axial direction in reference to the second rotational axis, in the direction of the second rim element, so that a bottom part of the vehicle tire makes contact with the second rim element, and a top side of the vehicle tire makes contact with the first rim element. Especially preferred, the actuating module locks the two rim halves with each other so that the vehicle tire is fixed, and/or form-locked, and/or friction-locked connected with the tool rim elements and that, in particular, the assembly process is completed.

In a further embodiment of the invention, the assembly device has at least one bead breaking module for the separation of the tire from the first or the second rim element. The bead breaking module is in particular connected with the assembly slider. Preferably, the bead breaking module has at least a stamp, and whereby the stamp preferably generates a force, in the axial direction with reference to the second rotational axis, at the tire sidewall so that the vehicle tire is especially separated from the first rim element. As an added option, the assembly device has an additional bead breaking module with at least an additional stamp, whereby the bead breaking module injects in particular at the opposite tire wall a force, whereby preferably the two bead breaking modules are positioned in parallel and opposite to each other, and can be activated preferably simultaneously.

In a preferred development, the receiving device has a filling unit for filling the vehicle tire with compressed air. In particular, the filling unit fills the vehicle tire, after the placement of the vehicle tire between the two rim elements, with compressed air. For instance, a tire pressure is at least 1 bar, preferably more than 2 bar, especially preferred more than 5 bar, and especially more than 10 bar. Alternatively or optionally in addition, the tire pressure is in particular less than 20 bar, preferably less than 8 bar, especially preferred less than 4 bar, especially less than 1 bar.

In a further preferred development, the filling unit has a control module to control the air pressure during the test process of the vehicle tire. In particular, the control module is designed for the monitoring of the air pressure and/or the control of the filling unit. In particular, the control module creates a constant air pressure during the duration of the test process so that preferably, in case of pressure loss, the air pressure can be re-adjusted.

In a structural embodiment, the load device has a load slider, wherein the load roller has a pivoted bearing on the load slider. In particular, the load slider has an axle on which the load roller is preferably mounted. The axle is positioned in particular on the first rotational axis and is preferably connected with the drive device. In particular the load roller is firmly connected with the axle, wherein the axle itself is connected with a shaft of the drive device. The load slider can be shifted within a shift direction. In particular, the shift direction runs in the direction of the receiving device and/or into an opposite direction. In particular, the load slider is positioned on at least one guiding element, for instance a track. Preferably, the load slider is slidably mounted on exactly two guiding elements, whereby the two guiding elements are, for instance, two spaced parallel tracks. Preferably, the load slider can be displaced by an additional drive device, for instance a spindle drive, in a sliding direction, wherein the sliding direction is preferably in the direction of the receiving device and in an opposite direction.

In a further embodiment, the measurement device has a tire storage device to accommodate at least an additional vehicle tire, wherein the higher storage device forms a bottom stall for additional vehicle tires. In particular, the tire storage device serves as timely limited storage of at least one vehicle tire, so that at least one vehicle tire is in the storage, simultaneously to an additional vehicle tire which is, for instance, being tested, and can be in particular prepared for the test process. In particular, the higher storage device is designed to accommodate at least one tire, preferably more than two, especially preferred more than four, especially more than eight tires. However, especially preferred is a design of the tire storage device for exactly four vehicle tires.

In a further design, the measurement device has an input interface and an output interface, wherein the input interface is designed for the loading of at least one vehicle tire and the output interface is designed for the ejection of the at least one vehicle tire. In particular, the input interface and/or the output interface are connected with additional systems of the manufacturing line and/or assembly line. The measurement device is designed for a fully automatic and/or automated test of the at least one vehicle tire between the input and output interface. In particular, the test device is loaded automatically with the vehicle tire and the test process is fully-automatically or automatically performed.

In an optional embodiment, the measurement device has a pre-centering device for the defined positioning of at least one vehicle tire. In particular, the pre-centering device functions to bring the vehicle tire first into a defined position so that the vehicle tire is preferably positioned in an ideal place or additional process steps. In particular the positioning takes place fully automatic and/or automatically and/or simultaneously to the test process of an additional vehicle tire.

Alternatively or as an optional addition, the measurement device has a soaping device for wetting the tire bead with a soap solution. In particular, the soaping device functions to prepare the vehicle tire in a way so that mounting of the vehicle tire with the receiving device takes place by reducing the friction, wherein, in particular, damage of the vehicle tire is reduced. In particular, the wetting takes place fully-automatically and/or automatically and/or simultaneously to the testing process of an additional vehicle tire and/or the positioning of an additional vehicle tire.

The pre-centering device and/or the soaping device are positioned between the input interface and the output interface. In particular, the pre-centering device is positioned in front of the soaping device, wherein the pre-centering device preferably loads the soaping device automatically with the prior adjusted vehicle tire. Especially preferred is the testing device positioned after the soaping device, whereby the soaping device preferably loads the measuring device automatically with the previously treated vehicle tire.

In an additional preferred designed, the measurement device has at least a conveyor device for the transport of the vehicle tire. In particular, the conveyor device has the function to convey at least one vehicle tire automatically in a conveyor device. In particular, the tire storage device has at least one, preferably two conveyor devices, and/or the pre-centering device at least one, and/or the soaping device at least one, and/or the measurement device at least one conveyor device. In particular, the respective conveyor devices are connected with each other and/or can be connected. Especially preferred is the design of the conveyor device of the tire storage device and/or the pre-centering device and/or the soaping device and/or the measurement device form a common conveyor device. Especially preferred, the conveyor device can be vertically adjusted so that the height of a conveyor device modified. In particular, the conveyor device has at least a conveyor belt, preferably two conveyor belts in parallel to each other. In particular, the conveyor device of the measuring device is adjustable in the vertical direction so that preferably the vehicle tire can be positioned in the axial direction in reference to the second rotational axis. Especially preferred are a placement and/or lifting of the vehicle tire by means of the conveyor device on the first and/or second rim element.

The input interface and the output interface are connected with each other by the conveyor device. In particular, the transfer of the at least one vehicle tire takes place fully automatically and/or automatically in the direction of transport. In particular, the transport takes place from the input interface through the tire storage device and/or through the pre-centering device and/or through the soaping device and/or through the measuring device to the output interface, wherein preferably the sequence relates to the direction of transport. For instance, an additional conveyor device is connected with the input interface and a second conveyor device is connected with the output interface so that, in particular, the vehicle tire can be fully automatically brought to additional processes and pledged or additional systems. Alternatively, the input interface and the output interface are connected with additional conveyor devices so that a closed loop of the vehicle tire can be realized.

In an additional output location, the input interface is created through the tire storage device and/or the output interface through the measurement device or the conveyor device. In particular, the at least one conveyor device of the tire storage device establishes the input interface. In particular, the conveyor device of the measuring device establishes the output interface. Alternatively a conveyor device which is connected with the measurement device establishes the output interface.

In an additional, preferred realization of the invention, the measurement device has a test chamber. In particular, after finishing the test process or rolling resistance measurement of the vehicle tire, the test tire is conveyed out of the test chamber and moved to the output interface, and simultaneously or with an offset, a new tire is transported to the input interface. In particular, the test chamber is a test cabin or a building room, for instance an industrial hall. In particular, the test chamber is designed for the reception of at least one, preferably more than three, most preferred of more than six, especially exactly seven vehicle tires.

Also, the test system has a temperature adjustment device. In particular, the temperature adjustment device is a temperature controller which preferably, due to the captured temperature value, automatically regulates a set temperature value.

The tire storage device and/or the pre-centering device and/or the soaping device and/or the measurement device are located in the test chamber. In particular, the tire storage device and/or the pre-centering device and/or the soaping device and/or the measurement device create a test station structure, whereby preferably the input interface and the output interface, especially preferred the higher storage device and/or the pre-centering device and/or the soaping device and/or the measurement device are at least connected through a conveyor device. In particular, the test station structure creates a tire conditioning path, whereby the test chamber is preferably positioned in the test chamber. In particular and in addition to the actually tested vehicle tire, the test chamber offers room or six additional tires so that it is preferably assured, during a test cycle of half an hour that each tire has been tempered in accordance with ISO 28580 for three hours before the measurement of the rolling resistance.

The temperature of the test chamber can be adjusted by the temperature adjustment device. In particular, the test chamber is thermally sealed so that preferably a constant temperature exists in the test chamber. In particular, the temperature is at least 15° C., preferably more than 20° C., especially preferred more than 35° C., and especially more than 45° C. Alternatively or as an optional addition, the temperature it is less than 60° C., preferably less than 40° C., especially preferred less than 30° C., and especially less than 25° C. The temperature, especially preferred, corresponds however with the requirements of the ISO 28580.

BRIEF DESCRIPTION OF THE DRAWINGS

Additional characteristics, and advantages, and impacts of the invention can be seen in the following description of preferred embodiments of the invention. Shown hereby:

FIG. 7 a longitudinal section cut through the test chamber where the test chamber is shown in a perspective view.

Correlating or same parts are identified with the same reference characters in the drawings.

DETAILED DESCRIPTION OF THE PREFERRED EMBODIMENTS

Figure 1:
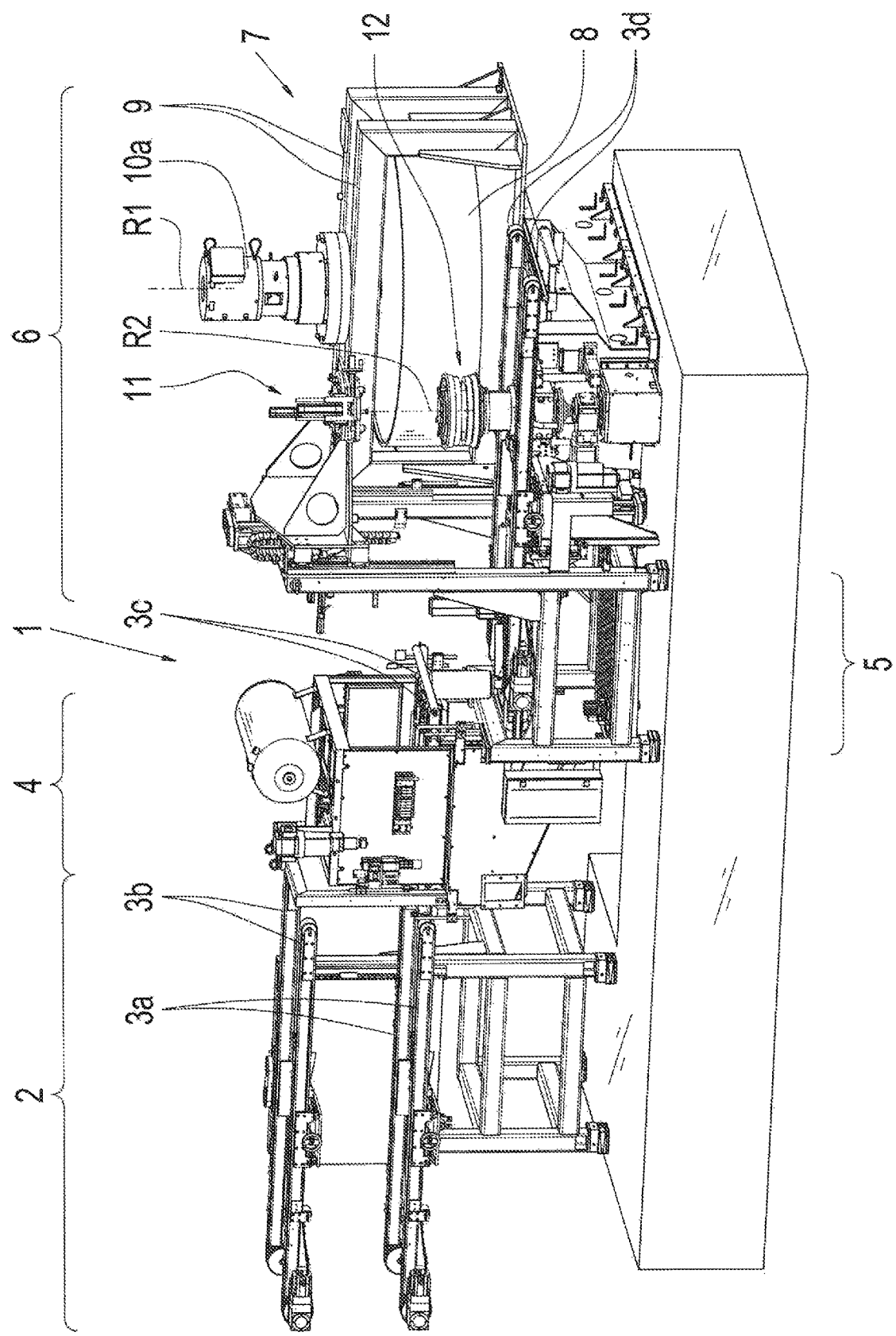
FIG. 1 a perspective view of a test station configuration has an embodiment example of the invention.

FIG. 1 shows in a perspective presentation a test station 1, comprising a tire storage device 2, a pre-centering device 4, a soaping device 5, and a measurement device 6. The tire storage device 2 has a first and a second conveyor device 3a, 3b. The tire storage device 2 is, for instance, designed to accommodate four vehicle tires, whereby two vehicle tires are positioned and/or can be positioned on the first conveyor device 3a and two vehicle tires on the second conveyor device 3b. Thus, the tire storage device 2 serves as the storage for the vehicle tires to be tested.

Following the tire storage device 2 is the pre-centering device 4, wherein the pre-centering device 4 has a third conveyor device 3c. The pre-centering device 4 is designed to accommodate an additional vehicle tire, preferably a fifth vehicle tire. As an example, the first or the second conveyor device 3a, 3b transports one of the vehicle tires in the direction of the pre-centering device 4, whereby the third conveyor device 3c accommodates the vehicle tire and whereby the vehicle tire is brought to a defined position in the pre-centering device 4.

The pre-centering device 4 is followed by the soaping device 5. The soaping device 5 and the measurement device 6 have a fourth conveyor device 3d, whereby the fourth conveyor device 3d creates a common conveyor device. The soaping device 5 is designed to accommodate an additional vehicle tire, preferably a sixth vehicle tire. The third conveyor device 3c transports one of the vehicle tires in the direction of the soaping device 5, wherein the fourth conveyor device 3d takes the vehicle tire of the pre-centering device 4. The vehicle tire, for instance its tire bead or the tire inside, are wetted in the soaping device 5 with a soap solution.

The soaping device 5 is followed by the measuring device 6. The measuring device 6 is designed for the accommodation of an additional vehicle tire, preferably of a seventh vehicle tire. The fourth conveyor device 3d transports one of the vehicle tires in the direction of the measuring device 6. The measuring device 6 comprises a load device 7, a receiving device 12, and an assembly device 11.

The load device 7 has a load roller 8, whereby the load roller 8 has a pivoted bearing in a load slider 9. Furthermore, the measurement device 6 has a first drive device 10a. The first drive device 10a, for instance an electric motor, is gear-wise connected with the load roller 8. The first drive device 10a transfers for instance a torque to the load roller 8, so that the load roller 8 is rotationally moved. The load roller 8 has a first rotational axis R1, wherein for instance a shaft of the first drive device 10a is positioned coaxial in reference to the load roller 8 on the first rotational axis R1, and is connected in a rotationally fixed manner with the load roller 8. In particular, the load roller 8 is rotationally moved by the first drive device 10a in a circular direction with respect to the first rotational axis R1.

The receiving device 12 defines a second rotational axis R2, wherein the assembly device 11 is coaxially positioned with respect to the second rotational axis R2. The receiving device 12 receives one of the vehicle tires whereby the reception takes place fully automatically. The assembly device 11 can be shifted axially relative to the rotational axis R2. The assembly device 11 locks or unlocks, respectively, the receiving device 12, so that a vehicle tire can be received or also ejected, respectively.

Figure 2:
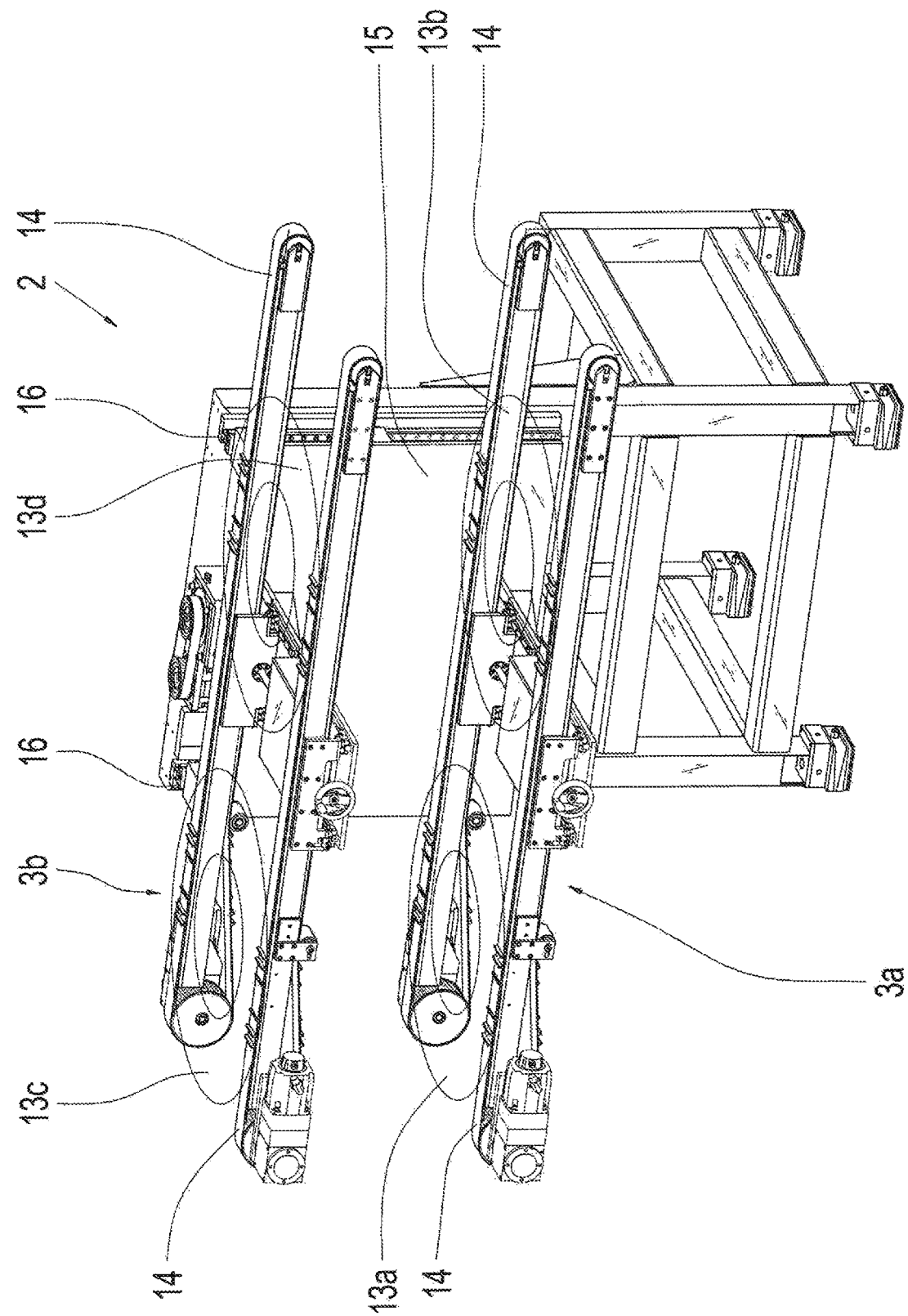
FIG. 2 a tire storage device of the test station in the same presentation as in FIG. 1.

FIG. 2 shows in a perspective presentation the tire storage device 2 with the first and the second conveyor device 3a, 3b. The first and the second conveyor device 3a, 3b are each formed with two parallel, spaced conveyor belts 14, for instance belt conveyor. The belt conveyors 14 have, for example for a better adhesion of a conveyed article, on its outer side a profile, for example bars. In the shown presentation, the first conveyor device 3a has a first and a second tire 13a, 13b. The second conveyor device has a third and a fourth tire 13c, 13d, whereby the tires 13a. 13b, 13c, 13d are schematically shown.

Also, the tire storage device 2 has an adjustment device 15. The first and the second conveyor device 3a and 3b are fixed and/or firmly bonded and/or traction-fixed connected with the adjustment device 15. The adjustment device 15 is formed by a plate, wherein the two conveyor devices 3a, 3b are mounted parallel and at a distance from each other at the plate. The adjustment device 15 can be vertically adjusted by two track modules 16 that are distanced from each other. As shown in FIG. 1, the tire storage device 2 is followed by the pre-centering device 4, wherein either the first of the second conveyor device 3a, 3b can load the pre-centering device 4. As required, the two conveyor devices 3a, 3b are adjusted by means of the adjustment device 15 in the vertical direction so that a respective loading of the pre-centering device 4 takes place.

Figure 3:
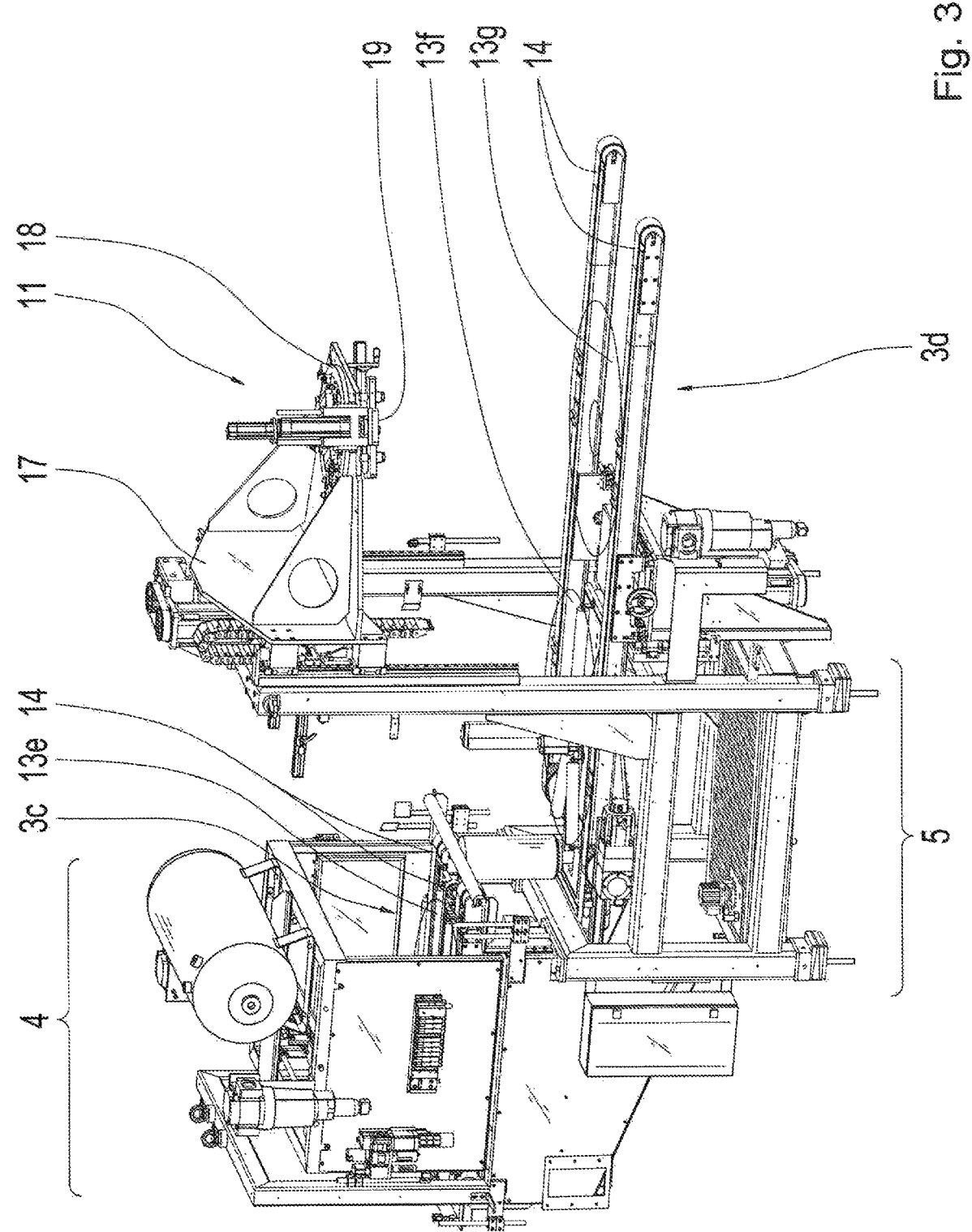
FIG. 3 a pre-centering device and a soaping device of the test station and an assembly device of a measurement device of the test station in a same presentation as in FIG. 1.

FIG. 3 shows in a perspective presentation the pre-centering device 4, the soaping device 5, and the assembly device 11. The third and the fourth conveyor device 3c, d are each formed, as already described in FIG. 2, again by two conveyor belts 14. The pre-centering device 4 has a fifth tire, only partially shown. The fifth tire 13e is being adjusted in the pre-centering device 4 for an additional process through the soaping device 5. The fourth conveyor device 3d can be vertically adjusted by an additional adjustment device so that the fourth conveyor device 3d can be adjusted to the same height as the pre-centering device 4 or the conveyor device 3c, respectively.

The soaping device 5 has a sixth tire 13f which is pre-conditioned by the soaping device 5 for the measurement device 6, so that for instance mounting the tire in the following test process at the receiving device 12 is made easier and thus, the material stress on the tire is reduced. The fourth conveyor device 3d has a seventh tire 13g. The seventh tire 13g, as shown in FIG. 1, is fully automatically received by the receiving device 12 and thereafter the rolling resistance measurement is processed. The assembly device 11 is positioned on the assembly slider 17 wherein the assembly slider 17 can be adjusted by means of an additional track module in the vertical direction, so that the assembly device 11, as shown in FIG. 1, axially to the second rotational axis R2 can be arbitrarily positioned. In addition, the assembly device 11 has an actuating module 18 and a bead breaking module 19. The actuating module 18 locks the receiving device 12 when, for instance, the seventh tire 13g is accommodated in the receiving device 12. For instance, the bead breaking module 19 is designed as a stamp which creates a force at the vehicle tire, for instance the tire flank, in the axial direction in reference to the second rotational axis R2. For example, the vehicle tire is pushed off at the same time as the assembly slider 17 pushes the first rim element 20a away from the second rim element 20b in the axial direction.

Figure 4:
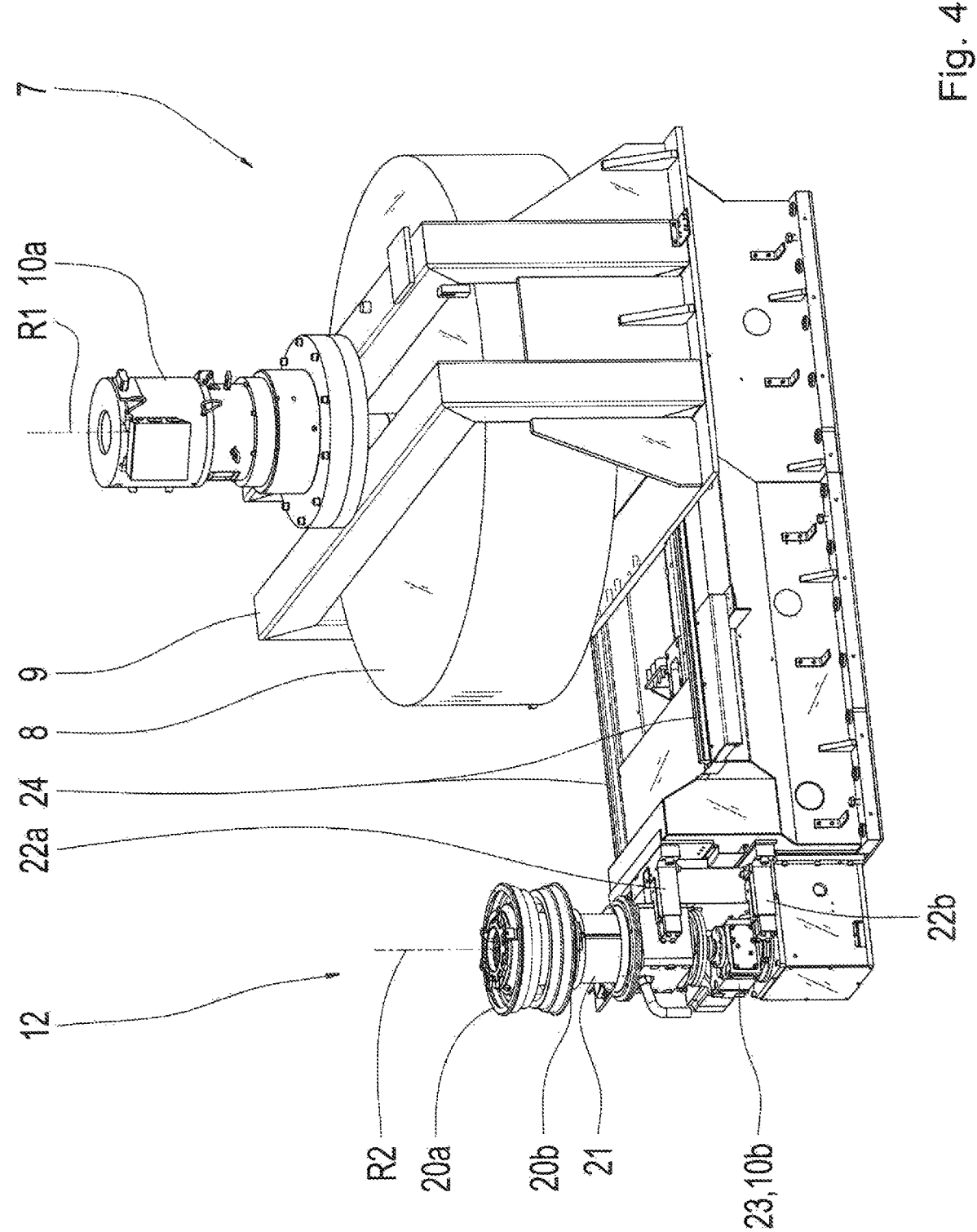
FIG. 4 a perspective view of a receiving device and a load device of the measurement device of the test station.

FIG. 4 shows in a perspective presentation the receiving device 12 and the load device 7 of the measurement device 6. The receiving device 12 has a first and a second rim element 20a, 20b, for instance two rim halves, whereby the two rim elements 20a, 20b create a split rim engagement system. The two rim elements 20a, 20b are pivoted coaxially to each other in reference to the second rotational axis R2. The two rim elements 20a, 20b can be separated from each other so that the vehicle tires can be positioned between the two rim elements 20a, 20b.

Hereby, the actuating module 18, as in FIG. 3, accommodates the first rim element 20a. The assembly slider 17 moves the first rim element 20a axially away from the second rim element 20b, so that the two rim elements 20a, 20b are distanced from each other. Thereafter, by means of the fourth conveyor device 3d, see FIG. 3, a vehicle tire is transported in the direction of the second rotational axis R2, so that the tire is positioned coaxially to the second rotational axis R2. Thereafter, the fourth conveyor device 3d is vertically adjusted so that a bottom side of the vehicle tire rests on the second rim element 20b. The assembly slider 17 moves the actuating module 18 with the first rim element 20a in the direction of the vehicle tire, so that the first rim element 20a rests on a top side of the vehicle tire. The actuating module 18 locks the two rim elements 20a, 20b with each other so that the vehicle tire is positioned in a rotationally fixed manner between the two rim elements 20a, 20b.

As an example, the receiving device 12 is designed to fill the vehicle tire with air pressure so that a determined higher pressure can be adjusted. After finishing the test process of the vehicle tire, the two rim elements 20a, 20b are again separated from each other whereby the bead breaking module 19 provides again a force at the vehicle tire.

The receiving device 12 has a measuring spindle 21, wherein the two rim elements 20a, 20b are positioned on the measuring spindle 21. As an example, the lower rim element 20b is fixed with the measuring spindle 21. The measurement device 6 has a second drive device 10b and at least one positioning device 23. As an example, the second drive device 10b and the positioning device 23 create a common drive device, for instance an electric motor. Alternatively, a positioning device 23 is separately positioned in reference to the second drive device 10b. The second drive device 10b is gear-wise connected with the measuring spindle 21. The second drive device 10b transfers torque to the receiving device 12, so that for instance the vehicle tire is brought into a rotation movement, with a rotation direction in reference to the second rotational axis R2. For instance, the vehicle tire is rotated in an opposite or same rotational direction and is the load roller 8.

The positioning device 23 is connected with the measurement spindle 21. For example, the positioning device 23 and/or the second drive device 10b are designed for the tilting of the receiving device 12 and/or for adjusting the rim width of the receiving device 12 and/or for displacing the receiving device 12 in a rotation movement in the circumferential direction with respect to the second rotational axis R2.

Alternatively, the measurement device 6 has at least an additional positioning device, in particular exactly three positioning devices. During tilting of the receiving device 12, the positioning device 23 tilts the receiving device 12 with the vehicle tire, particularly preferably the second rotational axis R2 with respect to the first rotational axis R1, so that a fall of the vehicle tire is simulated. Upon adjustment of the rim width, the adjustment device 23 changes the outer diameter of the two rim elements 20a, 20b in the radial direction with respect to the second rotational axis R2. It is now possible that the vehicle tires with different sizes can be accepted through the receiving device 12, without a required change of the rim elements 20a, 20b.

The measurement device 6 has at least a first and a second force detection device 22a, 22b. The first force detection device 22a is connected with the measuring spindle 21 and the second force detection device 22b is connected with the adjusting device 23. For instance, both force detection devices 22a, 22b and a force sensor, whereby the two force detection devices 22a, 22b are designed to detect the vertical wheel force. The assembly slider 9 of the load device 7 is positioned on at least one guiding module 24, for instance two tracks that are parallel to each other, so that the load device 7 or the load roller 8, respectively, can be moved in the direction of the receiving device 12.

Figure 5:
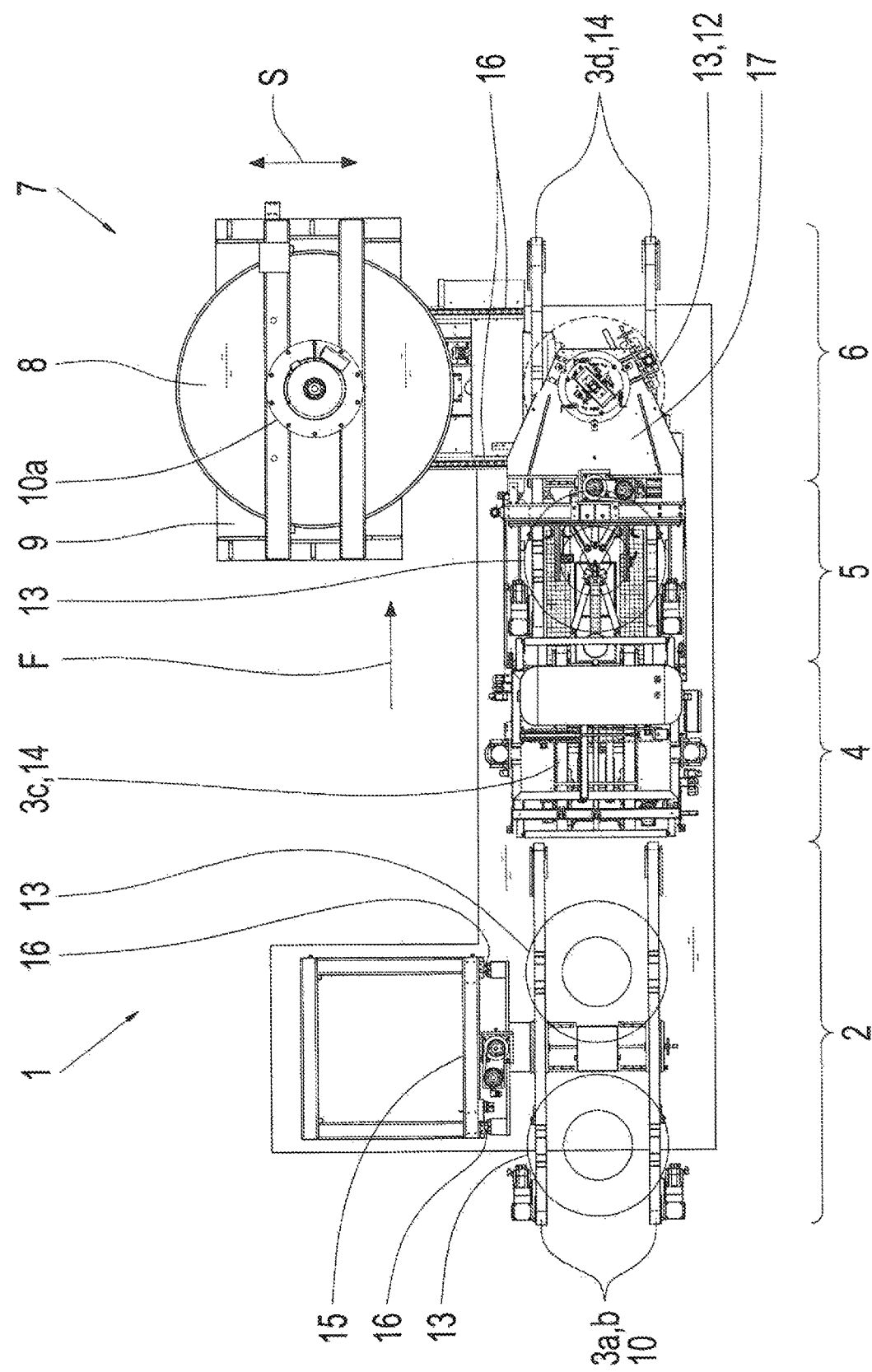
FIG. 5 a top view of the test station with the test storage, the pre-centering, the soaping, and the measuring device.

FIG. 5 shows a top view of the test station 1 with the tire storage device 2, the pre-centering device 4, the soaping device 5, and the measurement device 6. In FIG. 5, a vehicle tire 13 is presented schematically in different positions. In particular, the test station 1 defines a conveyor direction F, whereby the conveyor direction F runs from the tire storage device 2 in the direction of the measurement device 6.

In a first position, the vehicle tire 13 is accommodated by a tire storage device 2 by means of the first of the second conveyor device 3a, 3b and transported in the direction of the pre-centering device 4. For example, the vehicle tire 13 remains in each position for 0.5 hours until the change of the next position occurs. Especially preferred, the vehicle tire 13 changes position a total of three times within the tire storage device 2, so that it results in a total holding time of two hours while the vehicle tire 13 is in the tire storage device 2.

Thereafter, the vehicle tire 13 is transferred into the pre-centering device 4, whereby the vehicle tire 13 is accommodated by the third conveyor device 3c and is brought into a defined position. In total, the vehicle tire 13 remains for 0.5 hours in the pre-centering device 4. Through the third conveyor device 3c, the vehicle tire 13 is transport and in the direction of the soaping device 5, whereby the vehicle tire 13 is accommodated by the fourth conveyor device 3d.

In the load device 7, a pushing device S is activated hydraulically and/or electrically and/or pneumatically. Movement in the moving device S takes place, in the direction or opposite to the vehicle tire 13 or the receiving device 12, respectively, by the guiding modules 16. Hereby, the load device 7 is moved as far and the direction of the vehicle tire 13 until the load roller 8 contacts the tire and/or a defined vertical tire force has been reached, and the force is detected by the two force capturing devices 22a, 22b, as shown in FIG. 4. In particular, for each change of the position of the vehicle tire 13, a new tire is again transported so that, for instance, a tire is always present in each position. After finalizing the rolling resistance measurement, the vehicle tire 13 is transported further in the conveyor direction F and a new tire is loaded through the tire storage device 2.

Figure 6:
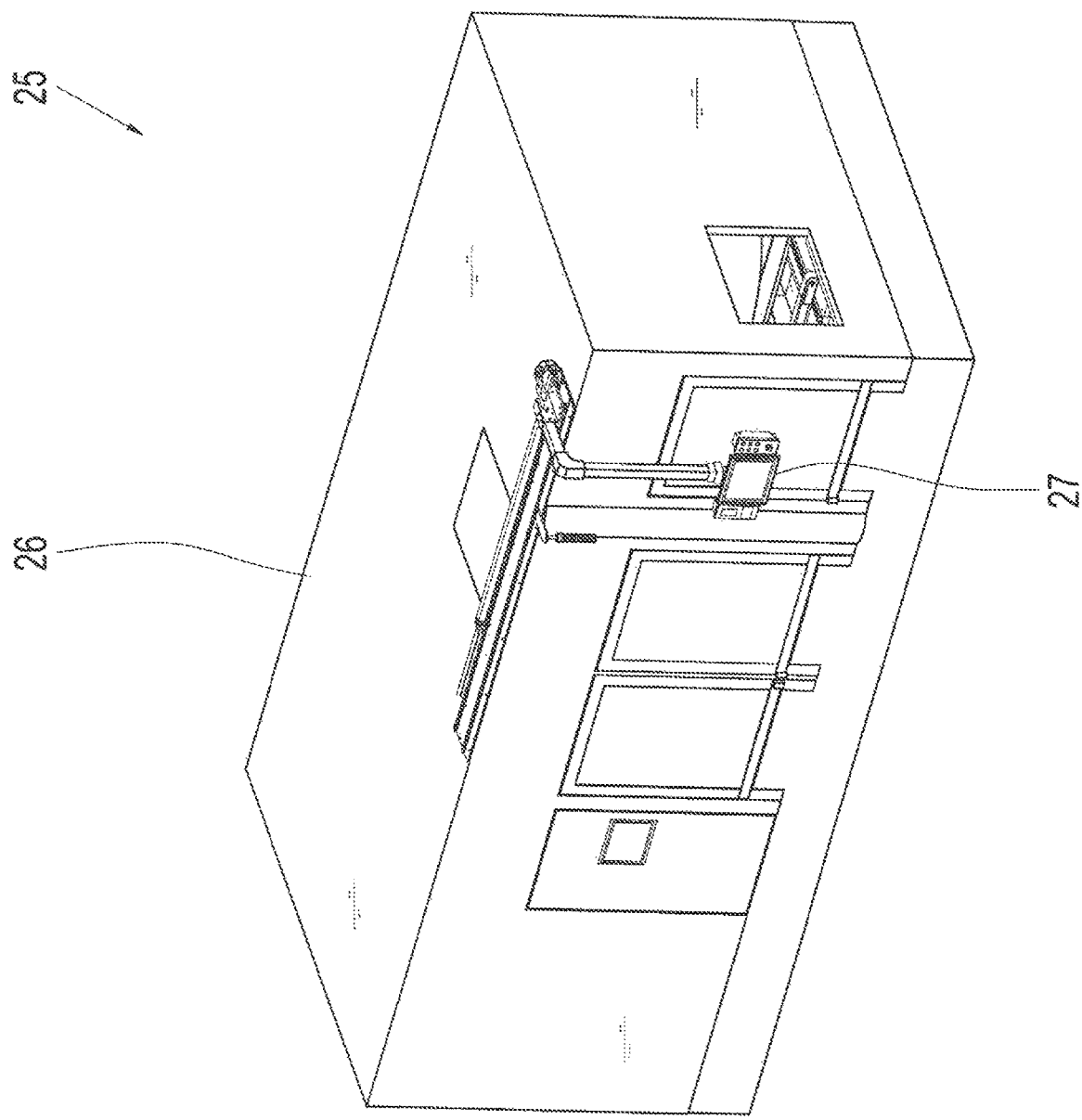
FIG. 6 a perspective view of a complete test system with a test chamber and an operating device.

FIG. 6 shows in a perspective presentation a complete test system 25, whereby the test system 25 has a test chamber 26, for instance test cell, for accommodating the test station 1. The test system 25 has an operating device 27, whereby the operating device 27 is positioned at the outer side of the test chamber 26. For example, the entire test system 25 can be controlled and monitored via the operating device 27. Particularly preferred is the control device 27 for controlling the test chamber temperature within the test chamber 25. For example, a temperature sensor is positioned in the test chamber 25 to capture the test chamber temperature. With the operating device 27, a desired test chamber temperature, for instance 25° C., can be set.

FIG. 7 shows a longitudinal section through the test chamber 26 with the test system 1. The test chamber 26 has an input interface 28a and an output interface 28b. The input interface 28a and the output interface 28b are for instance each designed as an opening at the outer wall of the test chamber 26. The input interface 28a is formed by the tire storage device 2, for example an additional system of an assembly and/or manufacturing line, has a further output interface, wherein the further output interface is connected to the input interface 28a. The output interface 28b is formed by the measuring device 6, in particular by the third conveyor device 3d, wherein for instance a further system for the assembly and/or manufacturing line as an further input interface, wherein the further input interface is connected to the output interface 28b. The input interface 28a is connected with the output interface 28b via the tire storage device 2, the pre-centering device 4, the soaping device 5, and the measuring device 6, in particular their conveyor devices, whereby the test system 25 is designed for a fully automatic and/or automatic testing of at least one vehicle tire 13 between the input and the output interface 28a, 28b.

REFERENCE CHARACTERS

1 Test Station
2 Tire Storage Device
3a First Conveyor Device
3b Second Conveyor Device
3c Third Conveyor Device
4 Pre-Centering Device
Soaping Device
6 Measurement Device
7 Load Device
8 Load roller
9 Load Slider
10a First Drive Device
10b Second Drive Device
11 Assembly Device
12 Receiving device
13 Vehicle Tire
13a First Tire
13b Second Tire
13c Third Tire
13d Fourth Tire
13e Fifth Tire
13f Sixth Tire
13g Seventh Tire
14 Conveyor Belt
Adjustment Device
16 Track Module
17 Assembly Slider
18 Actuating module
19 Disconnect Module
20a First Rim Element
20b Second Rim Element
21 Measuring Spindle
22a First Force Capturing Device
22b Second Force Capturing Device
23 Positioning Device
24 Guiding Module
Test System
26 Test Chamber
27 Operating Device
28a Input Interface
28b Output Interface
R1 First Rotational axis
R2 Second Rotational axis
F Conveyor Direction
S Pushing Device

The invention claimed is:

1. A test system for testing a rolling resistance of at least one vehicle tire with a measuring device, the measuring device having a load device, the load device having a load roller which applies a test load on the vehicle tire, and the load roller defining a first rotational axis,
    the measuring device having a receiving device which receives the vehicle tire, the receiving device and the load device being movable relative to one another, and the receiving device defines a second rotational axis,
    the measurement device having at least a first drive device, and the at least one drive device rotationally driving at least one of the load roller and the receiving device,
    the measurement device having at least one measurement configuration for measuring the rolling resistance,
    the receiving device having first and second rim elements, and the first and the second rim elements form a split rim engagement unit for accommodating the vehicle tire, and
    the measurement device has at least one positioning device which tilts at least one of:
    the second rotational axis relative to the first rotational axis, and/or
    the first rotational axis relative to the second rotational axis.

2. The test system according to claim 1, wherein the first rim element is a first rim half, and the second rim element is a second rim half, and the first and the second rim halves together form a measurement rim as the split rim engagement unit.

3. The test system according to claim 1, wherein at least one of the first and the second rim elements is axially movable relative to the second rotational axis, and the first rim element (20a), in a mounting position, is separated from the second rim element.

4. The test system according to claim 1, wherein the measurement configuration has at least one force detection device for measuring a wheel contact force, and the force detection device is connected to at least one of the receiving device and the load device.

5. The test system according to claim 4, wherein the measurement configuration has at least one further force detection device which measures a tangential force, and the further force detection device is connected to at least one of the receiving device and the load device.

6. The test system according to claim 1, wherein the measuring configuration has at least one torque detecting device which measures a torque, and the torque measuring device is connected to at least one of the receiving device and the load device.

7. The test system according to claim 1, wherein the measuring device has a second drive device, and the first drive device rotationally driving the load roller and the second drive device rotationally driving the receiving device.

8. The test system according to claim 1, wherein the measurement device has at least one assembly device, and the assembly device has at least one actuating module which locks the split rim engagement unit.

9. The test system according to claim 8, wherein the mounting device has at least one bead breaking module which applies a force on a sidewall of the vehicle tire and separates the vehicle tire from either the first or the second rim element.

10. The test system according to claim 1, wherein the receiving device has a filling unit which fills the vehicle tire with compressed air.

11. The test system according to claim 10, wherein the filling unit has a control module which controls air pressure in the vehicle tire during a measurement process of the vehicle tire.

12. The test system according to claim 1, wherein the load unit has a load slider, the load roller is rotatably supported in the load slider, and the load slider is displaceable in a direction of the receiving device.

13. The test system according to claim 1, wherein the test system has a storage device which accommodates at least one further vehicle tire, and the storage device forms a buffer storage for the at least one further vehicle tire.

14. The test system according to claim 1, wherein the test system has an input interface and an output interface, the input interface is configured for loading the at least one vehicle tire into the test system and the output interface is configured for removing the at least one vehicle tire from the test system, the test system is configured for at least one of fully automatic testing and automated testing of the at least one vehicle tire between the input and the output interfaces.

15. The test system according to claim 14, wherein the test system has at least one of:
   a pre-centering device for defined positioning of the at least one vehicle tire, and/or
   a soaping device which moistens a tire bead of the vehicle tire with a soap solution,
   the at least one of the pre-centering device and the soaping device is positioned between the input interface and the output interface.

16. The test system according to claim 14, wherein the test system has a plurality of conveyor devices which transport the vehicle tire, and the plurality of conveyor devices connect the input interface and the output interface with one another.

17. The test system according to claim 14, wherein the input interface is formed by an opening in a wall of a test chamber adjacent a tire storage device and the output interface is formed by an opening in another wall of the test chamber adjacent at least one of the measurement device and an end of a conveyor device.

18. The test system according to claim 14, wherein the test system has a test chamber and a temperature adjustment device, at least one of a tire storage device, a pre-centering device, a soaping device and the measuring device is positioned within the test chamber, and a temperature of the test chamber is adjustable by the temperature adjustment device.

19. A method of testing a rolling resistance of at least one vehicle tire with a test system having a measuring device that has a load device, the load device having a load roller which applies a test load on the vehicle tire and defines a first rotational axis (R1), the measuring device having a receiving device which receives the vehicle tire, the receiving device and the load device being movable towards one another, the receiving device defines a second rotational axis, the measurement device having at least one drive device that rotationally drives at least one of the load roller and the receiving device, the measurement device having at least one measurement configuration which measures the rolling resistance and the measurement device has at least one positioning device which tilts at least one of: the second rotational axis relative to the first rotational axis, and/or the first rotational axis relative to the second rotational axis, and the receiving device having first and second rim elements that form a split rim engagement unit, the method comprising:
   accommodating the vehicle tire on the divided rim engagement unit; and
   testing the vehicle tire.

* * * * *